UNITED STATES PATENT OFFICE 2,340,044

CONDENSATION PRODUCT AND PROCESS OF MAKING THE SAME

Gaetano F. D'Alelio, Pittsfield, Mass., assignor to General Electric Company, a corporation of New York No Drawing. Application August 30, 1941, Serial No. 409,017

5 Claims. (Cl. 260—69)

This invention relates to condensation products derived from novel starting materials containing amino, amide, and imino linkages. More particularly, it is concerned with nitrogen-containing resinous compositions comprising aldehyde condensation products of substituted or unsubstituted tricarbamido derivatives of trimethyl amine represented by the general formula

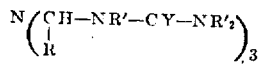

wherein Y represents oxygen or sulphur, R represents hydrogen or a monovalent aliphatic, carbocyclic or aromatic hydrocarbon radical of not more than six carbon atoms, and at least one R' represents hydrogen and the others either hydrogen or any monovalent hydrocarbon or halohydrocarbon radical, whether saturated or unsaturated, aliphatic, alicyclic, aromatic or heterocyclic, mono- or poly-nuclear, etc.

The class of organic compounds under consideration broadly designated as tricarbamido derivatives of trimethyl amine (either substituted or unsubstituted) have been found to react with aldehydes or aldehyde-engendering agents to form resins varying from clear liquid products to vitreous or semi-vitreous solid products. These compounds have further been found to function as catalytic reactants in the preparation of resins depending on condensation reactions for their formation and as curing reactants for resins obtained by condensation reactions.

These novel preformed substituted trialkyl amine compounds, reactable with aldehydes or agents engendering aldehydes, may suitably be prepared by reacting, in the cold, a concentrated aqueous solution of 1 mol of ammonia with a concentrated aqueous solution of 3 mols of a suitable class of compounds hereinafter referred to as preformed monocarbinol-ureas, which term is intended to cover not only the simple mono-(N-carbinol) derivatives of urea, such as monomethylol urea, but also the monocarbinal derivatives or substituted monocarbinol derivatives of urea and thiourea, or substituted ureas and thioureas, represented by the formula

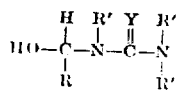

wherein, as previously indicated, Y represents oxygen or sulphur, R represents hydrogen or a monovalent aliphatic, carbocyclic or aromatic hydrocarbon radical of not more than 6 carbon atoms, and at least one R' represents hydrogen and the other (R')s either hydrogen or any monovalent hydrocarbon radical, examples of which are aliphatic (e. g. methyl, ethyl, propyl, isopropyl, butyl, secondary butyl, isobutyl, butenyl, amyl, isoamyl, hexyl, allyl, etc.) including cycloaliphatic (e. g. cyclopentyl, cyclopentenyl, cyclohexyl, cyclohexenyl, cycloheptyl, etc.); aryl (e. g. phenyl, diphenyl, naphthyl, etc.); alkaryl (e. g., tolyl, xylyl, ethylphenyl, propylphenyl, isopropylphenyl, etc.); aralkyl (e. g. benzyl, phenylethyl, phenylpropyl, etc.); and their homologues, as well as those groups with one or more of their hydrogen atoms substituted by a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc.

Examples of such monocarbinol-urea compounds other than the previously-mentioned monomethylol urea are: monomethylcarbinol urea, monomethylol thiourea, monomethylcarbinol thiourea, monoethylcarbinol urea, monopropylcarbinol urea, monoethylcarbinol thiourea, monophenylcarbinol urea (monobenzylol urea), monomethylol phenyl urea, monomethylol allylurea, monomethylol phenyl thiourea, monomethylol diphenyl urea, monomethylol ethyl phenyl urea, etc.

Preferably the novel compounds are prepared by slowly adding a cold concentrated solution of ammonia to a cold concentrated aqueous solution of the desired monocarbinol-urea in the ratio of 1 mol ammonia to 3 mols of the monocarbinol urea at a temperature between 0° and —20° centigrade. The mixture is held within this temperature range for the duration of the condensation reaction in which the ammonia reacts with the monocarbinol-urea to form the tricarbamido derivative of a trialkyl amine as follows:

NH₃+3HOCRH—NR'—CY—NR'₂ ⟶

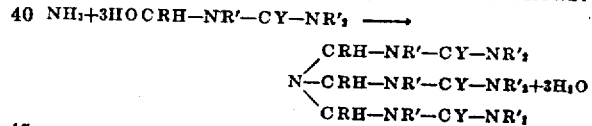

Thus 1 mol ammonia reacts with 3 mols monomethylol urea to form the simplest tri-(carbamidomethyl) amine having the formula

The product of this reaction is recovered by evaporation of the water from the reaction mixture at room temperature or at temperatures below room temperature, either at atmospheric or subatmospheric pressures.

Alternatively, the crystalline product may be recovered by adding to the aqueous solution of the reaction product a suitable water-miscible precipitant therefor, which precipitant is incapable of reacting with the desired crystalline product.

I have discovered that the class of compounds represented by the formula N(CHRNR'CYNR'$_2$)$_3$ is a very versatile class of organic compounds.

The compound N(CH$_2$·NH·CY·NH$_2$)$_3$ is more readily resinified by aldehydes than are the other compounds of the general formula

N(CRH·NR'·CY·NR'$_2$)$_3$ and the approximate ease of resinification decreases progressively as the hydrogens are replaced by monovalent hydrocarbon radicals.

The novel compounds of this invention may be used as reactant catalysts in the preparation of synthetic resins, especially aminoplast resins, from aldehydes and other aldehyde-reactable organic compounds, e. g. in the condensation of urea-formaldehyde, thiourea-formaldehyde, melamine-aldehyde, protein-aldehyde, phenol-aldehyde, etc. By a reactant catalyst is meant a substance that will accelerate the condensation between an aldehyde and an aldehyde-reactable organic compound while it itself becomes part of the resin. In this connection, the related compounds having no active hydrogens, i. e. having the formula N(CR$_2$—NR'—CY—NR'$_2$)$_3$, cannot participate in aldehyde condensation processes, but are, however, valuable as plasticizers or as direct condensation catalysts, as distinguished from reactant catalysts, in the preparation of resins, especially aminoplasts.

Being bases, the novel compounds of this invention and the related completely substituted compound mentioned above form salts with organic and inorganic acids such as hydrochloric, sulfuric, nitric, hydrofluoric, carbonic, formic, acetic, propionic, butyric, chloracetic, dichloracetic, benzoic, phthalic, cyclohexyl carboxylic, oxalic, malonic, succinic, adipic, maleic, fumaric, citraconic, acrylic, methacrylic, atropic, polyacrylic, polymethacrylic acids, etc. These acids will form salts with the novel class of compounds of this invention before, during, or after reaction with aldehydes, alone or co-reacted with other modifying bodies, as will be hereinafter shown. These salts are valuable in accelerating the conversion of the resins obtained from the base compound N(CRHNR'CYNR'$_2$)$_3$ and aldehydes to the insoluble and infusible state. They likewise function in accelerating the conversion of other aminoplast resins such as urea-aldehyde resins, melamine-aldehyde resins, protein-aldehyde resins, etc., or as curing reactants therefor. A curing reactant is defined as a substance which causes the curing or accelerates the curing of a resin while it itself is a part of the resin or at some time becomes an integral part of the resin. Since these salts become part of the resin, the final resin strictly may be called an aminoplast resin.

The novel class of organic compounds of this invention may be mixed with resin intermediates containing carbinol (—CR$_2$OH) groups, such as monomethylol ureas, dimethylol ureas, phenol methylols, protein methylols, the methylols of cyclic amidines, e. g., melamine-methylols, aminopyrimidine methylols, guanazole methylols, etc., and then co- or inter-resinified alone or in the presence of active methylene compounds or other modifying bodies.

Before, during, or after the resinification process, the reaction between the aldehyde, or a mixture of aldehydes, and the novel compounds of this invention may be modified by the presence of suitable amounts of a large class of compounds, for example hydroxy compounds, e. g. methyl, ethyl, propyl, isopropyl, butyl, amyl, tertiary amyl, benzyl, furfuryl, tetrahydrofurfuryl, cyclohexyl phenethyl, naphthyl, polyvinyl, allyl, methallyl, crotyl, 1-chlorallyl, propargyl, 2-chlorallyl, cinnamyl alcohols, etc., glycol, diethylene glycol, triethylene glycol, polyethylene oxide, glycerine, pentaerthritol, saligenin, phenol, cresol, xylenol, resorcinol, catechol, pyrogallol, etc.; chlorohydrin, epi-chlorohydrin, nitrobutanol, diacetone alcohol, ethylene oxide, propylene oxide, etc.; ammonia and its amino, amido, or imino compounds, e. g., methylamine, dimethylamine, hydroxylamine, hydrazine, phenyl hydrazine, diamylamine, stearyl amine, cyclohexyl amine, aniline, diphenylamine, diaminobenzene, triaminobenzene, aminophenol, nitro aniline, piperazine, ethanolamine, diisopropanolamine, triethanolamine, propanolamine, ethylene diamine, formamide, acetamide, propionamide, lauramide, acrylic amide, methacrylic amide, atropic amide, malonic diamide, itaconic diamide, succinic diamide, citraconic triamide, benzamide, phthalic diamide, phthalimide, benzoyl sulfinimide, benzoyl sulfonylimide, aminobenzene sulponylamide, benzene disulfonylamide, benzene trisulfonylamide, anthranilic esters, anthranilamide, salicylamide, para-phenyl benzene sulponylamide, tolyl amide, etc.; the amino 1,3,5 triazines, e. g., 2,4,6 triamino 1,3,5-triazine, 2-amino-1,3,5-triazine, 2,4-diamino-1,3,5-triazine; the diazines, e. g. 2,4,6 triamino pyrimidine, the diamino pyrimidine thio ethers; the amino-1,2,4-triazoles, e. g., guanazole, phenyl guanazole, dihydrazamido-1,2,4, pyrrodiazole, guanazo-guanazole, imidurazo-guanazole, the amino 1,2 diazoles, e. g. 3,5 diaminopyrazole, the urea type compounds, e. g. urea, methylurea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, dicyandiamide, guanyl urea, guanyl thiourea, the proteins, e. g., casein, soya bean protein, alfalfa protein, gelatin, coffee bean protein, alkyd resins having free hydroxyl groups such as glyceryl phthalate, oil-modified glyceryl phthalate, diethylene glycol succinate, triethylene glycol maleate, glyceryl maleate, etc.; nitriles, e. g., acetonitrile, propionitrile, butyronitrile, benzonitrile, acrylonitrile, methacrylonitrile, atropic nitrile, ethylene cyanohydrin, acetone cyanohydrin, amino-isobutyronitrile, amino-acetonitrile, etc.; esters such as lactic esters, hydroxy isobutyric esters, acetoacetic ester, malonic esters, etc.

The highly substituted novel compounds of this invention may be used as plasticizers for many resins, especially aminoplast resins. In many cases they themselves become resinous during the plasticizing process, while in other cases they condense with the resinous intermediate during manufacturing operations. Specifically, these materials may be used (1) unconverted as plasticizers, (2) partly or completely converted as plasticizers, (3) partly or completely intercondensed to exert a plasticizing effect.

The final and intermediate resins and condensation products prepared from the novel materials of this invention alone or with the modifications already expressed are extremely compatible with many other natural or synthetic resins in their intermediate or ultimate stages.

This novel class of compounds, when reacted with aldehydes, alone or with modifications, will form self-curing aminoplasts by condensation with curing reactants, such as chloracetonitrile, nitrourea, glycine, amino propanol hydrochlorode, mono-, di-, or tri-chloracetamides, alpha beta dibrompropionitrile, aminoacetamide hydrochloride, ethylene diamine monohydrochloride, sulfamic acid, chloracetyl urea, citric diamide, phenacyl chloride and others mentioned, for example, in my copending applications Serial Nos. 346,962, filed July 23, 1940, and Serial No. 354,395, filed August 27, 1940, both of which applications are assigned to the same assignee as the present invention.

The novel base materials of this invention may be used to peptize or swell proteins, shellac, acidic alkyd resins, etc., bringing them into solutions or dispersions or emulsions, or gels. Such compositions then may be "hardened" by the addition of aldehydes, preferably formaldehyde or compounds engendering formaldehyde, such as paraformaldehyde or hexamethylene tetramine.

The initial reaction leading to the formation of the new condensation products of ingredients comprising an aldehyde and a compound of the formula

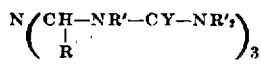

may be carried out at normal or at elevated temperatures, at atmospheric or superatmospheric pressures, and in the presence or absence of an acid or an alkaline condensing agent or catalyst. Preferably the reaction between the components is started under alkaline conditions.

Any substance yielding an alkaline aqueous solution may be used in obtaining alkaline conditions for the initial condensation reaction. For example, I may use an alkali such as sodium, potassium and calcium hydroxides, sodium and potassium carbonates, mono-, di- and tri-amines, etc. Best results are obtained by causing the condensation reaction between the primary components to take place in the presence of a primary condensation catalyst and a secondary condensation catalyst. To obtain condensation products having optimum time- or storage-stability characteristics I have found that the primary catalyst should be a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines, (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.).

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively I may first condense either the triureide derivative of the tertiary amine, or some other aldehyde reactable material such as a urea, a phenol, a melamine or the like, with a suitable aldehyde and thereafter, at any stage of the original reaction, I may add the remaining aldehyde-reactable ingredient or ingredients. Or, I may condense or partially condense my novel triureide derivative of a tertiary amine with an aldehyde, add the resulting product to a urea-aldehyde, a phenol-aldehyde, or some other partial condensation product of an aldehyde and an aldehyde reactable body and then cause the reaction to proceed further. Still other ways may be employed in combining the components in producing the modified or unmodified products of this invention, as will readily be understood by those skilled in the art from the following examples illustrating how the principles of this invention are carried into effect.

*Example I*

An aqueous solution of the compound $$N(CH_2NHCONH_2)_3$$

prepared in the manner set forth hereinbefore, was treated with various amounts of hydrochloric acid to produce solutions of mixtures of $N(CH_2NHCONH_2)_3$ and $HCl \cdot N(CH_2NHCONH_2)_3$ and solutions of $HCl \cdot N(CH_2NHCONH_2)_3$ alone or in acid solution. The evaporation of the water from these mixtures produced clear, colorless salts. These salts or solutions thereof are useful as reacting catalysts or as curing reactants in the preparation of resinous condensation products, as will be shown more fully hereinafter.

*Example II*

| | Parts by weight |
|---|---|
| Aqueous $N(CH_2NHCONH_2)_3$ (54% concentration) | 17.6 |
| Aqueous formaldehyde (approximately 37.1% $CH_2O$) | 9.6 |

The above components were mixed and heated under reflux at the boiling temperatures of the mass for 15 minutes, yielding a clear, resinous syrup having a resin solids content of 42% and a pH of 8.47. Upon testing this syrup on a hot plate at 150° C. it was found to cure slowly to a thermoplastic resin. The addition of a small amount (about 0.5 per cent) of chloracetamide, to the resinous syrup, followed by refluxing for a few minutes to cause the chloracetamide to intercondense with the components of the resinous syrup, produced a resin that cured rather rapidly at 150° C. to an insoluble, infusible state. Likewise, the addition of other curing reactants such as the salts of Example I, or of direct curing catalysts, such as citric acid, phthalic anhydride, etc. instead of the chloracetamide, produced a thermosetting resinous composition. Other curing reactants suitable for the production of my self-curing aminoplasts include nitrourea, glycine, trichloracetamide, phenacyl chloride, alpha beta dibromoproprionitrile, chloracetonitrile, chloral urea, sulfamic acid, citric acid diamide, chloracetyl urea and polysalicylide.

A molding compound was produced by mixing 3.5 parts alpha flock and 0.02 part of a mold lubricant, specifically zinc stearate, with the product obtained by heating a mixture of 13 parts of the resin syrup containing 0.05 part chloracetamide under reflux conditions for 10 minutes. The resulting wet molding compound was oven-dried at 70° C. for 3 hours. A sample of the dried compound molded at 130° C. at a pressure of 2000 pounds per square inch to yield a well-cured piece.

*Example III*

| | Parts by weight |
|---|---|
| Aqueous N(CH$_2$NHCONH$_2$)$_3$ (54%) | 17.6 |
| Furfural | 3.8 |
| Sodium hydroxide in 0.5 part water | 0.01 | were mixed and refluxed for 30 minutes. A clear resinous syrup was produced having a pH of 7.9. This syrup cured to a tough hard resin when tested at 150° C. on a hot plate with curing agents such as citric acid, mineral acids, etc.

*Example IV*

| | Parts by weight |
|---|---|
| Aqueous N(CH$_2$NHCONH$_2$)$_3$ (54%) | 17.6 |
| Acrolein | 2.24 |
| Sodium hydroxide in 0.5 part water | 0.01 | were mixed and heated under reflux for 30 minutes. A clear syrup with a pH of 8.21 was obtained. This syrup cured to a hard resin when treated at 150° C. with agents such as those used in Example III.

*Example V*

| | Parts by weight |
|---|---|
| Aqueous N(CH$_2$NHCONH$_2$)$_3$ (54%) | 11 |
| Urea | 3 |
| Aqueous formaldehyde (approximately 37.1% CH$_2$O) | 10 |

The above ingredients were heated together at the boiling temperature of the mass under reflux for 30 minutes to produce a clear resinous syrup with a pH of 7.75. When treated with the curing reactants, acids, etc., previously expressed, a hard infusible resin was obtained. The syrup was converted to a molding compound by adding 0.1 part chloracetamide to 23 parts syrup, refluxing for 10 minutes and then adding 7 parts alpha flock and 0.04 part zinc stearate. The compound was dried at 70° C. for 3 hours, then molded at 130° C. A very well-cured molded piece was produced.

*Example VI*

| | Parts by weight |
|---|---|
| Aqueous N(CH$_2$NHCONH$_2$)$_3$ (54%) | 11 |
| Thiourea | 3.8 |
| Aqueous formaldehyde (approximately 37.1% CH$_2$O) | 10 | were mixed and heated under reflux for 30 minutes to yield a clear resinous syrup. The pH of this syrup was 7.65. The addition of agents such as chloracetamide, glycine, citric acid, etc., to this syrup gave a product curing to an infusible hard resin at 150° C. on a hot plate. The syrup was used to make a molding compound as follows:

| | Parts by weight |
|---|---|
| Syrup | 23 |
| Chloracetamide | 0.1 |

These materials were refluxed together for 10 minutes, at the end of which time the pH was 3.7. Seven parts alpha flock and 0.04 part zinc stearate were added and the wet molding compound was dried at 70° C. for 3 hours. When molded at 130° C., the product possessed excellent cure characteristics.

*Example VII*

| | Parts by weight |
|---|---|
| Aqueous N(CH$_2$NHCONH$_2$)$_3$ (54%) | 2.2 |
| Para toluenesulfonamide in 6 parts water | 8.6 |
| Aqueous formaldehyde (approximately 37.1% CH$_2$O) | 10 | were mixed and heated under reflux for 30 minutes. There was produced a water-insoluble resin that was converted to a clear thermoplastic mass on the hot plate at 150° C. This resin was soluble in Solvatone.

*Example VIII*

| | Parts by weight |
|---|---|
| Aqueous N(CH$_2$NHCONH$_2$)$_3$ (54%) | 1.88 |
| Aqueous formaldehyde (approximately 37.1% CH$_2$O) | 12 |
| Melamine | 6.3 | were mixed and heated under reflux for 15 minutes. A clear syrup was produced that slowly cured to a hard resin when treated on the hot plate at 150° C. The condensation with curing reactants and the additions of acids accelerated the cure. The syrup was converted into a molding compound as follows:

| | Parts by weight |
|---|---|
| Syrup | 11.5 |
| Chloracetamide | 0.05 | were heated under reflux for one minute to give a syrup with a pH of 7.8. Then 3.5 parts alpha flock and 0.02 part zinc stearate were added and the compound dried at 70° C. for 3 hours. A very well-cured piece was obtained by molding the compound at 130° C.

*Example IX*

The following:

| | Parts by weight |
|---|---|
| Aqueous N(CH$_2$NHCONH$_2$)$_3$ (54%) | 5.3 |
| Aqueous formaldehyde (approximately 37.1% CH$_2$O) | 19.5 |
| Phenol (synthetic) | 9 | were mixed and heated under reflux for 30 minutes. This gave a syrup with a pH of 7.35 that, when tested alone or with acids, cured to a hard infusible resin on the hot plate at 150° C. The syrup was converted to a molding compound by acidifying with 0.25 part citric acid and then adding 11.5 parts alpha flock and 0.1 part zinc stearate. The syrup after acidification had a pH of 4.6. The compound was dried at 70° C. for 5 hours and molding at 130° C. and 2000 pounds per square inch pressure for 5 minutes produced a well-cured piece.

*Example X*

The following:

| | Parts by weight |
|---|---|
| Aqueous N(CH$_2$NHCONH$_2$)$_3$ (54%) | 4.4 |
| Dimethylol urea in 25 parts water | 23.3 | were mixed and refluxed for 30 minutes. The pH of the syrupy product was 7.1. When the syrup was treated with various curing reactants and acids (e. g. chloracetamide, citric acid, etc.) and cured on the hot plate at 150° C. a hard infusible resin was obtained. It was converted into a molding compound as follows:

| | Parts by weight |
|---|---|
| Syrup | 23 |
| Chloracetamide | 0.1 | were refluxed together for 10 minutes. Seven parts alpha flock and 0.04 part zinc stearate were added and the wet compound was dried at 70° C. for 3 hours. Molding at 130° C. gave a very well-cured piece.

Example XI

A phenol-aldehyde varnish was compounded as follows:

| | Parts by weight |
|---|---|
| Phenol—82% (12% ortho cresol) | 180 |
| Aqueous formaldehyde (37.1%) | 216 |
| $Na_2CO_3 \cdot H_2O$ in 4.15 parts water | 1.8 | were mixed and refluxed for 30 minutes to produce a resinous solution having a resin solids content of 53% and a pH of 8.8. The hot plate cure at 150° C. for this varnish was 85 seconds. The addition of 10 parts by weight (based on solids content thereof) of the resin syrup of Example II to 90 parts by weight (based on the solids content thereof) of this phenolic varnish produced a mixture having a hot plate cure at 150° C. less than the 85 seconds required for the phenolic varnish itself. Specifically, the mixture had a cure of approximately 65 seconds.

Example XII

Example XI was repeated, using a substantially anhydrous liquid phenol-aldehyde resin freed from catalyzing bases and salts, instead of the phenolic varnish specified therein. The results obtained were similar to those of Example XI in that the $N(CH_2NHCONH_2)$—$CH_2O$ condensation product reacted with the phenol aldehyde resin to give a product having a hot plate cure (150° C.) of 120 seconds as compared with 135 seconds required for the phenolic resin itself.

Example XIII

| | Parts by weight |
|---|---|
| Aqueous $N(CH_2NHCONH_2)_3$ (54%) | 17.6 |
| Aqueous formaldehyde (approximately 37.1% $CH_2O$) | 9.6 | were refluxed together for 15 minutes. This syrup was then reacted with trimethylol melamine as follows:

| | Parts by weight |
|---|---|
| Primary resin syrup of Example II | 15 |
| Aqueous trimethylol melamine (50%) | 15 | were mixed and heated under reflux for 15 minutes to produce a clear colorless syrup. This syrup slowly cured to an infusible resin on the hot plate at 150° C. Curing reactants, acids, etc., accelerated the cure.

Example XIV

| | Parts by weight |
|---|---|
| Aqueous $N(CH_2NHCONH_2)_3$ (54%) | 8.8 |
| Aqueous formaldehyde (approximately 37.1% $CH_2O$) | 4.8 |
| Glycerine | 1.84 | were mixed and refluxed for 30 minutes to produce a clear syrup having a pH of 8.15. When evaporated, a clear, colorless resin was obtained. This formed a tough resin on the hot plate at 150° C. When treated with agents, such as phthalic acid, or intercondensed with curing reactants, such as chloracetamide, the cured resin became very hard.

Example XV

| | Parts by weight |
|---|---|
| Aqueous $N(CH_2NHCONH_2)_3$ (54%) | 8.8 |
| Aqueous formaldehyde (approximately 37.1% $CH_2O$) | 4.8 |
| Polyvinyl alcohol | 5.8 | were heated together under reflux for 15 minutes to form a clear, colorless very viscous solution. The pH was 8.0. Control of the pH of the reaction mixture by the addition of suitable acids made it possible to obtain cured articles of almost any plasticity. Transparent colorless films of extreme toughness were produced by baking at moderate temperatures. The product is also suitable for the manufacture of cast products.

Example XVI

| | Parts by weight |
|---|---|
| Aqueous $N(CH_2NHCONH_2)_3$ (54%) | 8.8 |
| Aqueous formaldehyde (approximately 37.1% $CH_2O$) | 4.8 |
| Butyl alcohol | 7.4 | were mixed and heated under reflux for one hour, thereby producing a clear, colorless syrup with a pH of 8.05. When concentrated, a very viscous clear, colorless resin was obtained that became a transparent thermoplastic resin when heated on the hot plate at 150° C. This resin could be hardened by the addition of suitable hardening agents.

Example XVII

| | Parts by weight |
|---|---|
| Aqueous $N(CH_2NHCONH_2)_3$ (54%) | 8.8 |
| Aqueous formaldehyde (approximately 37.1% $CH_2O$) | 6.4 |
| Diethyl malonate | 1.6 | were heated together under reflux for one hour to produce a solution with a pH of 5.36. On concentration, a clear, colorless resin was obtained that bodied to a transparent thermoplastic mass when heat-treated at 150° C. The resin was soluble in water and alcohol. A hard transparent film was obtained from the product acidified with citric acid, etc., and baked at 60° C. for several hours.

Example XVIII 2.0 parts of a 54% water solution of

$HCl \cdot N(CH_2NHCONH_2)_3$ prepared as described in Example I were added to 23 parts of a varnish prepared by mixing and refluxing the following ingredients for 30 minutes:

| | Parts by weight |
|---|---|
| Urea | 60 |
| Aqueous formaldehyde (approximately 37.1% $CH_2O$) | 161 |
| Aqueous ammonia (28%) | 6 |
| Sodium hydroxide in 5 parts water | 0.1 |

The product was a syrup with a pH of 7.05 that cured on the hot plate at 150° C. without the addition of any other curing agent. It was converted to a molding compound by the addition to 23 parts of the syrup of 7 parts of alpha flock and 0.04 part zinc stearate. The compound was dried at 70° C. for 3 hours. A piece molded at 130° C. and 2000 lbs. per square inch for 5 minutes possessed a very good cure.

Example XIX

| | Parts by weight |
|---|---|
| Alkyd resin (e. g. glyceryl phthalate resin) | 50.0 |
| $N(CH_2NHCONH_2)_3$ | 2.0 |
| Paraform | 3.0 | were mixed intimately and then fused on the hot plate at 150° C. There was produced an infusible, hard, clear, colorless resin. The above fusible resin is suitable for the bonding of mica.

Example XX

| | Parts by weight |
|---|---|
| Shellac | 50.0 |
| N(CH₂NHCONH₂)₃ | 2.0 |
| Paraform | 3.0 | were mixed and fused as above at 150° C. A hard, infusible resin was produced. The above fusible resin may be used for mica binding.

Example XXI

The following:

| | Parts by weight |
|---|---|
| Aqueous N(CH₂NHCONH₂)₃ | 13.2 |
| Aqueous formaldehyde (37.1%) | 7.2 |
| Acetamide | 0.89 | were mixed and heated under reflux for one hour. The pH was 7.68. On the hot plate at 150° C. this syrup forms a clear, colorless thermoplastic resin that becomes thermosetting upon the addition of curing reactants and acids of the type previously set forth. The syrup was converted into a molding compound as follows:

| | Parts by weight |
|---|---|
| Syrup | 23 |
| Chloracetamide | 0.1 | were heated together under reflux for 10 minutes to give a solution with a pH of 3.8. Seven parts alpha flock and 0.04 part zinc stearate were added and the compound was dried at 70° C. for 3 hours. Molding at 130° C. 2000 pounds per square inch for 5 minutes produced a well-cured article.

Example XXII

The following:

| | Parts by weight |
|---|---|
| Aqueous N(CH₂NHCONH₂)₃ (54%) | 17.6 |
| Aqueous formaldehyde (37.1%) | 9.6 | were mixed and heated under reflux for 15 minutes. 2.4 parts urea and 6.4 parts of 37.1% aqueous formaldehyde were added and the reflux continued for 15 minutes. A clear, colorless gel was obtained that cured of its own accord on the hot plate at 150° C.

In producing these new condensation products, the choice of the aldehyde component is dependent largely upon economic considerations and the particular properties desired in the finished product. I prefer to use as the aldehyde reactant, formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Various aldehyde-addition products may be used instead of aldehydes. Such products include the mono- and poly- (N-carbinol) derivatives, more particularly the mono- and poly- methylol derivatives, of urea, thiourea, selenourea, and iminourea, substituted ureas, thioureas, selenoureas and iminoureas, derivatives of amides of polycarboxylic acids, e. g., maleic, itaconic, fumaric, adipic, malonic, citric, phthalic, etc. I may also use with particularly good results, the methylol melamines, e. g., mono-, di-, tri-, tetra-, penta-, and hexa-methylol melamines. Mixtures of these materials or mixtures of an aldehyde with such materials may also be used.

The ratio of aldehydic reactant to the triureide derivatives may be varied over a wide range but ordinarily is of the order corresponding to at least one mol of the aldehyde, or an equivalent amount of an aldehyde engendering- or addition products, for each mol of the triureide derivative. Thus, I may use, for example, from one to five or six mols, preferably 3 mols, of an aldehyde for each mol of the triureide derivative.

Dyes, pigments, plasticizers, mold lubricants, opacifiers, and various fillers (e. g. wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g. paper, cloth, sheet asbestos, etc. are coated and impregnated with the resin, superimposed and thereafter united under heat and pressure. They may also be used as modifiers of, or may be modified by, the synthetic compositions disclosed in various copending applications of mine, for example in copending applications Serial Numbers 409,018; 409,019; 409,020; 409,021; and 409,022; filed concurrently herewith and assigned to the same assignee as the present invention. More specifically, the compositions of this invention may be used in the form of mixtures with condensation products of preformed substituted or unsubstituted mono- or di- (carbamidomethyl) amines and aldehydes, or condensation products of substituted or unsubstituted mono-, di-, or tri- (monocarbinolureidomethyl) amines, or with two or more of such condensation products. They may be used in the production of wire or baking enamels, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be employed for treating cotton, linen, and other cellulosic materials in sheet or other form. They also may be used as impregnants for electrical coils and for other electrically insulating applications.

What I claim as new and desire to secure by Letters Patent of the United States is:

1. A composition comprising the product of reaction of melamine, a tri-(monocarbamidomethyl) amine having the formula

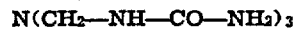

and formaldehyde.

2. A heat-curable composition comprising the heat-convertible product of reaction of (1) a partial condensation product of ingredients comprising melamine, an aldehyde and a triamine derivative of the general formula

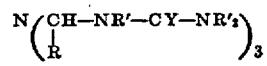

where Y is a member of the class consisting of oxygen and sulphur, R is a member of the class consisting of hydrogen and a monovalent hydrocarbon radical of not more than six carbon atoms, and at least one R' is hydrogen and the others are members of the class consisting of hydrogen and monovalent hydrocarbon and halogeno-hydrocarbon radicals and (2) a chlorinated acetamide.

3. A product comprising the heat-cured composition of claim 2.

4. The method of preparing new condensation products which comprises effecting reaction between ingredients comprising melamine, an aldehyde and an amine corresponding to the formula $$N\left(\underset{R}{\mathrm{CH-NR-CY-NR'_{2}}}\right)_{3}$$

where Y is a member of the class consisting of oxygen and sulphur, R is a member of the class consisting of hydrogen and a monovalent hydrocarbon radical of not more than six carbon atoms, and at least one R' is hydrogen and the others are members of the class consisting of hydrogen and monovalent hydrocarbon and halogeno-hydrocarbon radicals.

5. A resinous composition comprising the product of reaction of melamine and an aldehyde and a tri-(monocarbamidomethyl) amine having the general formula $$N\left(\underset{R}{\mathrm{CH-NR'-CY-NR'_{2}}}\right)_{3}$$

where Y is a member of the class consisting of oxygen and sulphur, R is a member of the class consisting of hydrogen and monovalent hydrocarbon radicals of not more than six carbon atoms, and at least one R' is hydrogen and the others are members of the class consisting of hydrogen, monovalent hydrocarbon radicals and monovalent halogeno-substituted hydrocarbon radicals.

GAETANO F. D'ALELIO.